United States Patent
Giffen et al.

[15] 3,673,049
[45] June 27, 1972

[54] GLASS LAMINATED BODIES COMPRISING A TENSILELY STRESSED CORE AND A COMPRESSIVELY STRESSED SURFACE LAYER FUSED THERETO

[72] Inventors: James W. Giffen; David A. Duke, both of Corning; William H. Dumbaugh, Jr., Painted Post; James E. Flannery, Corning; John F. MacDowell, Painted Post; John E. Megles, Corning, all of N.Y.

[73] Assignee: Corning Glass Works, Corning, N.Y.

[22] Filed: Oct. 7, 1970

[21] Appl. No.: 78,763

Related U.S. Application Data

[63] Continuation-in-part of Ser. No. 735,074, June 6, 1968, abandoned.

[52] U.S. Cl. .................................161/164, 65/41, 65/114, 65/121, 65/145, 106/39 R, 106/48, 106/54, 161/166, 161/193, 161/165
[51] Int. Cl. .....................................B32b 7/02, B32b 17/06
[58] Field of Search................161/1, 43, 193, 166, 164, 165; 65/41, 114, 145, 121; 106/54, 39 DV, 48, 52, 53, 39 R; 117/123 A, 124 A, 125

[56] References Cited

UNITED STATES PATENTS

| | | | |
|---|---|---|---|
| 1,960,121 | 5/1934 | Moulton | 161/166 |
| 2,157,100 | 5/1939 | Rowland | 106/48 X |
| 3,384,508 | 5/1968 | Bopp et al. | 106/54 X |
| 3,428,475 | 2/1969 | Teeg | 117/124 X |
| 3,473,937 | 10/1969 | Tashiro et al. | 117/124 X |
| 1,734,964 | 11/1929 | Danner | 65/121 X |

Primary Examiner—Robert F. Burnett
Assistant Examiner—Joseph C. Gil
Attorney—Clarence R. Patty, Jr. and Clinton S. Janes, Jr.

[57] ABSTRACT

This invention relates to sound, high strength, laminated articles of glass, glass-ceramic, glass and glass-ceramic materials. Such articles are made by means of a continuous hot-forming process wherein glasses are melted for the individual layers and these layers are then simultaneously fused together and shaped into a laminated structure of a desired configuration. Where a glass-ceramic article is desired, the laminated glass structure is subsequently heat treated in a particular manner to cause the glass to crystallize in situ.

15 Claims, 4 Drawing Figures

PATENTED JUN 27 1972 3,673,049

INVENTORS.
James W. Giffen
David A. Duke
William H. Dumbaugh, Jr.
James E. Flannery
John F. MacDowell
John E. Megles
BY
ATTORNEY

GLASS LAMINATED BODIES COMPRISING A TENSILELY STRESSED CORE AND A COMPRESSIVELY STRESSED SURFACE LAYER FUSED THERETO

This application is a continuation-in-part of our pending application, Ser. No. 735,074, filed June 6, 1968, now abandoned.

BACKGROUND OF THE INVENTION

In the past, glass has been thought of as a weak and brittle material. Although glass is a brittle material, it cannot truly be classified as a weak one. Glass normally fails in tension as a result of surface defects. Therefore, many attempts have been made to strengthen glass by providing it with a surface layer which is in compression.

A mid seventeenth century curiosity known as the Prince Rupert Drop was amongst the first reported strengthened glasses. The basic mechanism, although not known at the time, has since been defined and is now known as tempering. Tempering comprises rapidly cooling a glass object so as to establish a temperature gradient therein under conditions where the glass is sufficiently low in viscosity to yield and release temporary stresses. As the object is cooled to room temperature, the temperature gradient originally established disappears, and a state of stress is created with the central section of the object in tension and the outer surface section in compression. This surface compression increases the strength of the body. The degree of strengthening will depend upon the temperature from which the body was cooled and the rate of cooling.

There are several chemical techniques by which glass articles may be strengthened, all of which are relatively new. One such technique comprises contacting the surface of a sodium or potassium silicate glass article, at a temperature above the strain point of the glass, with an external source of lithium ions. This contact causes the lithium ions to replace the sodium or potassium ions in the surface of the glass yielding a surface laying have a lower coefficient of thermal expansion than the parent glass. Thus, when the body is cooled below the strain point of the glass, the higher expansion interior contracts more than the lower expansion exterior leaving the low expansion surface layer in a state of residual compression.

A second chemical strengthening technique has been developed wherein large potassium ions from a salt bath are exchanged for smaller sodium ions in the glass at temperatures below that at which the glass can flow and relieve the stresses. Therefore, the introduction of the potassium ion into the positions previously occupied by the sodium ion results in a crowding of the surface. This crowding creates a rather high residual compressive stress in the surface and a counter-balancing tensile stress in the interior.

Strengthening by the use of an overlay is also known to the art. An excellent example of this is found in U.S. Pat. No. 2,157,100 wherein the patentee teaches a method of strengthening a ceramic insulator by applying a glaze having a coefficient of thermal expansion approximately 10 percent less than that of the ceramic body. Upon cooling, the glaze is left in a state of residual compression thereby effectively increasing the strength of the whole body. This technique is well-known and documented throughout the china-body industry, and is the typical method for strengthening dinnerware. Still higher strength bodies have been developed by glazing glass-ceramic articles. Special glazes have been applied to glass-ceramics so that upon maturing, a crystalline interlayer is formed between the glass-ceramic and glaze. This interlayer permits greater differences in the coefficients of thermal expansion and thus higher strength bodies. These glazes and their application to glass-ceramic articles are described in U.S. Pat. No. 3,384,508.

In 1891, Otto Schott made boiler gauge glasses by overlaying a high expansion glass with a low expansion glass. He did this by inserting an iron rod into molten high expansion glass, gathering a gob of this glass on the rod, cooling it slightly, and then inserting it into a second pot of molten low expansion glass. He then drew the composite glass into a rod. Upon cooling, the low expansion exterior glass was left in a state of residual compression, thereby strengthening the composite.

U.S. Pat. No. 1,960,121 teaches a process for forming a strengthened composite glass article wherein the index of refraction of the article is the same throughout. The disclosure in that patent indicates that a method of strengthening glass by utilizing two or more layers of glasses having different coefficients of thermal expansion is well known in the art. The disclosure also indicates that the relationship between the thickness of the various layers and the coefficients of expansion of the various glass layers is also well known and that the lower expansion layer is always the thinnest of the layers. Furthermore, the patent teaches that the layers should be united while they are still soft. A British Patent, No. 405,918, teaches that it is known to join together two or more laminae of fluid glass having different coefficients of expansion. However, the disclosure indicates that there are problems in cutting and forming of these bodies. Therefore, it suggests that two or more sheets having the required coefficients of expansion be cut in the cold state and then heated to a temperature at which their viscosities will be between $10^8$ and $10^{13}$ poises. Thereafter, the separate sheets can be pressed or rolled together so as to form a laminated sheet. By this process, a strengthened laminated sheet wherein no problems of controlling the size and shape thereof can be produced.

From the above references, it is evident that the general concept of producing a strong laminated composite body, wherein the layers are of different coefficients of thermal expansion, is well known. However, to date there has been no true commercial production of hot laminated glass bodies. Furthermore, there appears to be no consistent definition of parameters necessary to produce such bodies. For example, although it is stated that there should be a difference in coefficient of expansion, there are no teachings as to what these differences should be. Similarly, it is stated that there should be differences in the thicknesses of the layers, but again there is no teaching of the thicknesses which are permissible and their relation to the coefficient of expansion. Neither is there any teaching as to the interrelation, if any, between the differences in the coefficients of expansion and the thicknesses of the layers. It is also stated that the glasses should be soft but there is no disclosure of the viscosities thereof or the temperatures at which such bodies are formed. Neither is there a statement as to the relationship, if any, between the viscosities of the different layers. Thus, there is no teaching in the art as to how to prepare a hot-laminated strengthened glass body. Neither is there a teaching of how to prepare the laminate in a continuous, rather than a batch, process.

The prior art does not teach the stress distributions and magnitudes thereof which will produce a desirable laminated body. The distribution and magnitude of the stresses will determine the strength of the body and the violence of breakage of such a body. The only teaching available is U.S. Pat. No. 2,177,336 which relates to tempered glass bodies. However, the teaching therein is not applicable with respect to what is necessary in a laminated system, for a number of reasons. Tempered glass must be relatively thick in order to achieve strengthening, which is not the case with laminated glass. The stress distribution in tempered ware is significantly different than in laminated ware. These differences are readily seen when FIGS. 1 and 2 and FIGS. 3 and 4 are compared. Furthermore, much higher ratios of maximum compression to maximum tension can be obtained in laminated ware than in tempered ware. Thus, the violence of breakage of tempered ware will generally be greater than that with laminated ware, since for the same maximum compressive surface stress the tempered ware has a much higher interior tensile stress. Finally, although various physical properties are discussed in the art, there is no indication as to the glass compositions, or families thereof, which would produce acceptable laminated glass bodies for commercial use were not solved by the prior art.

SUMMARY OF THE INVENTION

We have invented a strengthened laminate system for the production of glass, glass-ceramic, or glass and glass-ceramic bodies which are relatively inexpensive in composition, readily producible commercially, and do not exhibit high violence of breakage. The basic unit of this invention is comprised of a tensilely stressed core portion having adhered thereto and being substantially enveloped by a compressively stressed layer. The laminate of our invention can assume many forms such as a sheet, a rod, a sphere, etc. In the case of a sheet or shapes made therefrom, the laminate can be considered to be made up of three plies, a core ply being tensilely stressed and having two compressively stressed plies adhered thereto. These compressively stressed plies correspond to the layer described above. In all shapes, it is preferred that the compressively stressed layer should completely envelop the composite article; however, exposure of a small portion of the inner structure will not deleteriously affect the laminate of our invention.

We have found that the laminate of this invention must be formed at elevated temperatures so as to obtain intimate bonding, or fusion, of the core and adhered layer. The formation at elevated temperatures is advantageous in that the glass surfaces when fused are virgin or defect free. These glasses have not been handled and are so fluid that any surface defects will heal. Thus, the surfaces have not been mechanically degraded. At the lamination temperature, the viscosity of the core and adhered layer must bear a particular relation to each other. Thus, at the lamination temperature the core must be between about 1 to 6 times as viscous as the adhered layer. Furthermore, the liquidus temperature of the glasses must be low enough to avoid devitrification during laminating. In order that the laminate will be strengthened, the adhered layer of the laminate must have a coefficient of thermal expansion at least $15 \times 10^{-7}/°$ C. less than that of the core at the setting point of the softest glass in the laminate. However, if the laminate is completely glass-ceramic the coefficient of thermal expansion of the adhered layer may be at least $5 \times 10^{-7}/°$ C. less than that of the core at the setting point of the softest glass-ceramic in the laminate. Moreover, to insure proper strengthening and breakage characteristics, the ratio of core thickness to total adhered layer thickness (i.e., the total of the core and adhered layer thicknesses when viewed in cross section) should be between about 10:1 and 30:1.

DESCRIPTION OF THE PREFERRED EMBODIMENT

Figure 1:
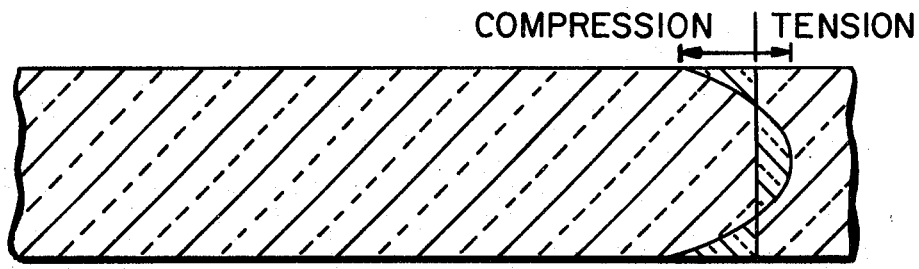
FIG. 1 is a representation of the cross-sectional stress distribution in a tempered body.
Figure 2:
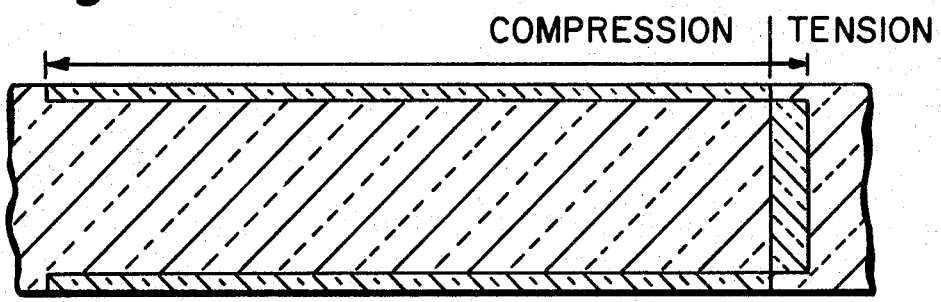
FIG. 2 is a representation of the cross-sectional stress distribution of a laminated body having the same maximum internal tensile stress as the body in FIG. 1.
Figure 3:
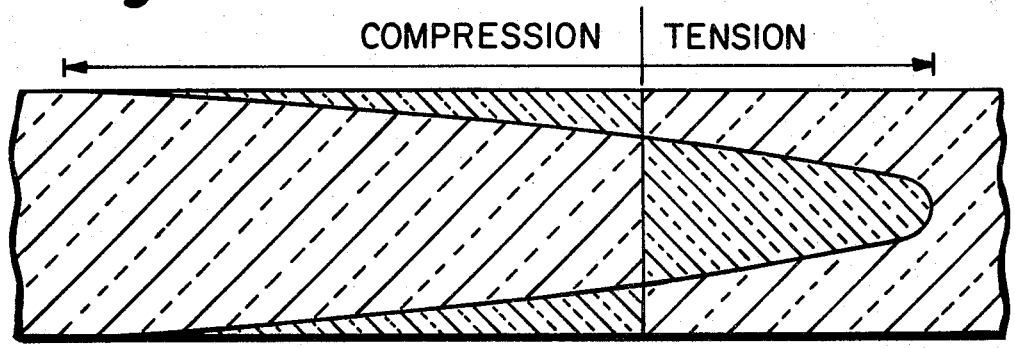
FIG. 3 is a representation of the cross-sectional stress distribution in a tempered body.
Figure 4:
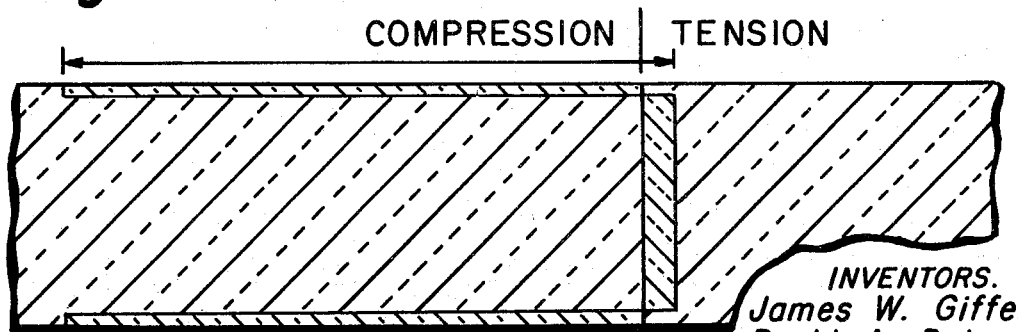
FIG. 4 is a representation of the cross-sectional stress distribution of a laminated body having the same maximum compressive stress as the body of FIG. 3.

We have found that three-ply laminated articles are particularly desirable and when made in accordance with this invention derive many of their beneficial properties from a unique stress distribution which can be obtained only in a laminated body. The cross-sectional stress distribution can be characterized as rectilinear. That is, the compressively stressed outer ply of the body always experiences about maximum compression while tensilely-stressed core ply always experiences about maximum tension. This is observed in FIGS. 2 and 4. Thus, very high compressive stresses can be introduced into the adhered plies while the magnitude of the counterbalancing internal tension is relatively low. For example, the ratio of maximum compression to maximum tension can be on the order of 20:1; whereas in a thermally tempered body that ratio may be about 2:1. Thus, for the same maximum tension much greater maximum surface compression can be obtained in the laminated system than in a tempered glass as is seen when FIGS. 3 and 4 are compared. Violence of breakage is related to total tensile strain energy in the body, which is in turn related, to some extent, to the maximum tensile stress and relative thicknesses of the core and adhered plies. Therefore, in bodies of the same thickness having the same compressive stress the violence of breakage is lower in the laminated body than in the tempered body, since the maximum tensile stress is lower in the laminated body than in the tempered body. Furthermore, the maximum stresses developed in the laminate are related to the ratio of the thicknesses of the core to adhered plies and not to the absolute thickness. This is opposed to a tempered body wherein the stresses are related to the actual thickness in addition to the thickness ratio.

We have found that, for the preferred bodies of our invention, the flexural strength of the laminate as measured in terms of modulus of rupture (MOR) should be between about 25,000 and 50,000 psi. If the MOR is below about 25,000, the bodies will not be strong enough to resist severe mechanical impact. However, if the MOR is above about 50,000 psi, failure of the preferred bodies by breakage can be quite violent. Strengths of this level are attained by controlling the difference between the coefficient of thermal expansion of the core ply and adhered plies, otherwise known as the expansion mismatch, and by controlling the thickness of the respective plies.

In a laminated system, one factor in determining the stress in the laminate is the amount of strain in the object. The strain is determined at the setting point of the softest material in the laminate. The setting point of a glass is defined as a temperature 5° C. above the strain point. The stress in a body can then be calculated using, among other things, the strain. Rather than actually measuring strain, a good approximation thereof is the difference in the coefficient of expansion of the glasses as measured from 25° C. to 300° C., multiplied by the temperature differential from the setting point to the use temperature. Another way of viewing this is that there must be at least some minimum difference in expansion, between the glasses, at the setting point of the system. In laminates having at least one glass ply, the difference in expansion, or expansion mismatch, which is necessary in order to attain the above mentioned strength levels is at least about $15 \times 10^{-7}/°$ C. However, where the laminate is all glass-ceramic the difference must be at least $5 \times 10^{-7}/°$ C. Furthermore, these differences in expansion are interrelated with the thickness of the various plies. In normal commercial practice, the coefficient of thermal expansion for the core ply should be between about 60 and $110 \times 10^{-7}/°$ C.; the coefficient of thermal expansion of the adhered plies should be between about 30 and $80 \times 10^{-7}/°$ C. In our preferred embodiment, which has at least one glass ply, the coefficient of expansion of the adhered plies is approximately $46 \times 10^{-7}/°$ C. and the coefficient of thermal expansion of the core ply is approximately $67 \times 10^{-7}/°$ C. This results in an expansion mismatch of about $21 \times 10^{-7}/°$ C. which is in excess of the minimum mismatch of $15 \times 10^{-7}/°$ C.

A very important factor in determining the strength of the body is the thickness ratio of the core ply to adhered plies. For the preferred embodiment, with the aforementioned coefficients of expansion, and expansion mismatches, we have found that the thickness ratio should be between 10:1 and 30:1, preferably 15:1. If the ratio is less than 10:1, for example 5:1, there would be a concomitant high violence of breakage. This is related to the high tensile stress in the core and the resultant sensitivity to material defects, such as stones. However, if the ratio were greater than 30:1, for example 40:1, the adhered plies in the preferred body would be relatively thin and, as a result, normal handling could introduce surface defects which could penetrate therethrough. Hence, in the preferred embodiment, a thickness ratio of greater than 30:1 could result in mechanically non-durable bodies. However, if the surface were protected so that a mechanically durable surface were not essential, the thickness ratio could be in excess of 30:1 and still maintain the desired high compressive stress.

In the preferred embodiment, the actual total thickness of the adhered plies is about 0.006 inch, with about 0.003 inch on either side of the core and the core thickness is about .070 inch minimum. This results in a thickness ratio for the body of the preferred embodiment of 70:6, or about 12:1. Thus, the body formed with the aforementioned preferred thicknesses, thickness ratios, expansions, and expansion mismatches will result in a laminated body wherein the compressive stress in the adhered plies is approximately 30,000 psi.

The glass laminate of this invention may be used for tableware; therefore, it is desirable that, in case of failure, the laminated body does not fail violently. In other words, the violence of breakage should be low. The violence of breakage is related to the amount of tensile strain energy within the laminate. The amount of tensile strain energy is related to the expansion mismatch and the thickness of the plies. If the tensile strain energy is high, the violence of breakage will also be high. The normal mode of a violent break is dicing, or fracture, of the body into many small pieces. It is quite obvious that it is undesirable to have these small pieces flying about. Therefore, the tensile strain energy ought to be maintained at a relatively low level but sufficient to allow strengthening of the body. Delayed breakage is another problem which is related to strain energy; that is, a flaw may unintentionally be introduced into the surface and failure from that flaw will not initiate until some finite time after the introduction thereof. This failure could occur even as the user is opening the cupboard to remove a piece of previously stored tableware. To avoid this delayed breakage, the level of tensile strain energy is maintained at a relatively low level. Thus, it is not desirable to strengthen these particular bodies beyond about 50,000 psi since above that stress level the tensile strain energy is considered to be sufficient to cause violent breakage or delayed breakage. On the other hand, it is sometimes permissible to produce articles which have a high violence of breakage, as for example, in building tiles, roofing tiles, or wall tiles. This high violence of breakage is controlled by providing the body with a high level of internal tensile strain energy. This level of tensile strain energy is provided through the selection of appropriate ply thicknesses, thickness ratios, expansions, and expansion mismatches. Thus, with this system of lamination, bodies having a predetermined level of violence of breakage can be produced.

One of the primary advantages associated with this laminating system is that the weight of the body may be low since the strength level is high without a large cross-section. Thus, by the appropriate choice of coefficients of thermal expansion, expansion mismatch, thickness ratios, and actual thicknesses, a sound, strong, light-weight laminated body may be produced.

The three-ply bodies of the preferred embodiment are fabricated by forming a laminated sheet, shaping the laminated sheet, and then cutting out the desired shape. The core ply may be exposed along the cut edge during the cutting step; however, this exposure is not preferred since a stronger body can be produced when the core ply is completely enveloped. By appropriately designed cutters, the amount of exposed core ply can be minimized; furthermore, other secondary operations can completely envelop the core ply. In order to form the laminated sheet, it is necessary that at the moment of lamination, the viscosity of the core ply and the adhered plies be in a ratio of from about 1:1 to 6:1. We have found that the sheet may readily be formed when the viscosity ratio is between about 2.5:1 and 3.5:1. Normally, during the laminating operation the core and adhered plies are maintained at the same temperature while maintaining the desired viscosity ratio. However, the core and adhered plies can be at different temperatures when laminated so long as the viscosities are within the required ratio. On an absolute scale for the preferred embodiment, the viscosity of the core ply is approximately 4,000 poises and the viscosity of the adhered ply is approximately 1,500 poises, at the laminating temperature. This viscosity ratio is about 3:1. The selection of the absolute viscosities is related to the particular laminate forming technique used. For example, if an updraw or downdraw process were used or shapes other than a sheet were made, a different set of viscosities would be selected; however, the ratio of viscosities would remain within the aforementioned 1:1 to 6:1 range. Hence, in tube or cane drawing processes, viscosities between about 50,000–200,000 poises may be required; whereas, in an updraw process for glass sheet, a viscosity of 100,000–250,000 poises may be required.

We have found that the most convenient laminating temperatures, for the laminate of the preferred embodiment, are in the range of between about 1,225° C. and 1,325° C. The preferred laminating temperature is about 1,275° C. The liquidus temperature of the glasses used for the core and adhered plies should be low enough so as to avoid devitrification during laminating. In view of the range of laminating temperatures, the liquidus temperature can be as high as 1,300° C.; however, we prefer to use glasses having a liquidus temperature below about 1,200° C.

It may be desirable to heat treat the laminated body formed by the aforementioned process. Normally, the heat treating temperatures are maintained below 850° C., since above that temperature the bodies tend to distort. Above 850° C., it is necessary to heat treat the bodies in formers so as to maintain their shapes. In order to help prevent distortion of the bodies during heat treatment below 850° C., it is desirable that at some temperature below the laminating temperature, but above the heat treating temperature, there should be a reversal of the viscosity relationship at lamination. Thus, at temperatures less than the maximum heat treating temperature, or 850° C., the viscosity of the adhered plies will be greater than that of the core ply. This higher viscosity tends to prevent distortion of the body during heat treatment. Thus, at the heat-treating temperatures the glass of the adhered plies is more viscous than the core glass. In addition to helping prevent distortion, this higher viscosity tends to prevent deformation of the adhered ply which is in contact with the lehrbelt, or metal conveyor belt, which carries the body through the heat treating furnace. Similarly, the adhered plies should have a high annealing point, at least 600° C., so that during heat treatment deformation of adhered plies is further prevented. In the preferred embodiment, the annealing point should not be lower than 700° C. However, if there is no subsequent heat treatment, the annealing point of the adhered plies can be below 600° C.

The composition range for glasses for the adhered layer, or plies, which meet the aforementioned requirements, in weight percent on the oxide basis as calculated from the batch, is disclosed below. $SiO_2$ should be present between about 50–65 percent. Below 50 percent, the annealing point is too low and the expansion tends to be too high. Above 65 percent, the viscosity in the forming range is too high. $Al_2O_3$ should be present from about 10 to 20 percent. Below 10 percent, the annealing point is too low and above 20 percent, the liquidus is too high. CaO should be present between about 5 and 25 percent. Below 5 percent, the glass melts poorly, above 25 percent, the expansion is too high. MgO should be between about 0–12 percent. Above 12 percent, the liquidus temperature is too high. $B_2O_3$ should be in the range of about 0–10 percent. Above 10 percent, the chemical durability of the glass is poor. Optionally, a total of up to about 12 percent of the following oxides may also be incorporated to slightly modify the properties of the skin glass to within the desired ranges: BaO, SrO, ZnO, and $La_2O_3$. Furthermore, up to about 5 percent of the following oxides can, also, be introduced to adjust the properties to within the previously stated limitations: $Li_2O$, $Na_2O$, $K_2O$, $TiO_2$, and $ZrO_2$. When the laminate of this invention is used to form tableware, the chemical durability of the skin glass is a very important factor. Glasses for the adhered plies having a composition which falls within the ranges described above have sufficient chemical durability so that they may be used as tableware.

A preferred glass for the adhered plies which falls within the above composition range is, in weight percent on the oxide basis as calculated from the batch, 59.4% $SiO_2$, 14.9% $Al_2O_3$, 14.6% CaO, 6.6% MgO, and 4.5% $B_2O_3$. This glass was made by preparing a batch comprising the following batch ingredients:

| | |
|---|---|
| Morgan 200 Mesh Sand | 892.93 grams |
| A-1 Calcined Alumina | 227.20 grams |
| Boric Acid | 120.21 grams |
| Calcium carbonate | 391.40 grams |
| Magnesium Oxide | 98.10 grams |

This batch was then melted in a platinum crucible at 1,550° C. for 4 hours, cast into a slab and annealed at 725° C. The properties of the glass prepared in this manner were as follows: softening point 901° C., annealing point 713° C., strain point 674° C., density of 2.570 g/cc., viscosity at 1,300° C. of 800 poises, the coefficient of thermal expansion between 0°–300° C. was $46.9 \times 10^{-7}/°$ C., liquidus 1,176° C., and chemical durability (measured as weight loss in 5% HCl at 95° C. for 24 hours) 0.21 mg/cm².

Other glasses falling within the range of desired properties are disclosed in Table I.

present from between about 5 to 25 percent by weight. Preferably, $Na_2O$ should comprise over about one-half of the total alkali, but not necessarily. The $K_2O$ can be present in amounts of up to about 6 percent. $Li_2O$ is of little effect but may be incorporated in some glasses. If the total alkali metal oxide is less than 5 percent, the expansion is too low and the viscosity may be too high. On the other hand, if the alkali is above 25 percent, the viscosity may be too low. Optionally, from about 0 to 20 percent of the alkaline earth metal oxides may be added. MgO and CaO are preferred. These oxides are added to adjust the properties of the glasses to within the desired ranges. If more than 20 percent is added, a satisfactory combination of expansion and viscosity is difficult to obtain. Additionally, up to a total of about 10 percent of the following oxides may be added to modify the properties: $La_2O_3$, $TiO_2$, $ZrO_2$, $Nb_2O_5$, ZnO, CdO, $GeO_2$, PbO, $Bi_2O_3$, $CeO_2$, and $B_2O_3$. To aid in fining, up to a total of about 2 percent of $As_2O_3$ and $Sb_2O_3$ may be added. Similarly, up to about 1.5 percent chloride may be added to aid in fining. NaCl, KCl, or $CaCl_2$ are typical chloride fining agents which may be used. If it is desired to color the glass, up to 5 percent of the oxides of the following metals may be added: Cr, Mn, Fe, Co, Cu, Nd, V, and Ni.

TABLE I.—ADHERED LAYER GLASSES

| | 1 | 2 | 3 | 4 | 5 | 6 | 7 | 8 | 9 | 10 | 11 | 12 |
|---|---|---|---|---|---|---|---|---|---|---|---|---|
| Weight percent oxides: | | | | | | | | | | | | |
| $SiO_2$ | 58.0 | 64.1 | 62.0 | 57.1 | 58.9 | 54.8 | 60.4 | 58.9 | 56.6 | 56.5 | 62.0 | 59.9 |
| $Al_2O_3$ | 15.0 | 12.0 | 14.7 | 15.1 | 14.7 | 15.0 | 14.3 | 14.0 | 14.8 | 14.8 | 14.8 | 15.5 |
| CaO | 10.0 | 19.3 | 23.3 | 12.8 | 23.1 | 13.0 | 14.0 | 22.0 | 12.0 | 11.8 | 14.3 | 6.8 |
| MgO | 7.0 | 4.6 | | 9.3 | | 9.2 | | | 8.6 | 8.5 | | |
| $B_2O_3$ | 4.0 | | | 5.7 | 3.3 | 8.0 | | | 8.0 | 5.7 | | 2.1 |
| BaO | 6.0 | | | | | | | | | | | |
| ZnO | | | | | | | 6.3 | | | | 6.5 | 12.3 |
| $Na_2O$ | | | | | | | 5.0 | 5.0 | | | | 0.1 |
| $TiO_2$ | | | | | | | | | | 2.7 | | 2.4 |
| $Li_2O$ | | | | | | | | | | | 2.4 | 0.9 |
| Properties: | | | | | | | | | | | | |
| Expansion (0°–300° C.), $\times 10^{-7}/°$ C | 46.0 | 52.0 | 54.7 | 47.8 | 54.2 | 48.0 | 59.7 | 70.0 | 46.0 | 47.0 | 53.0 | 36.4 |
| Softening point, ° C | 910 | 928 | 952 | 886 | 907 | 880 | 877 | 971 | 883 | 887 | 817 | 873 |
| Annealing point, ° C | 712 | 746 | 772 | 704 | 730 | 692 | 682 | 700 | 700 | 708 | 628 | 656 |
| Strain point, ° C | 665 | 704 | 728 | 663 | 692 | 653 | 636 | 660 | 661 | 670 | 586 | 615 |
| Density, g./cc | 2.63 | 2.610 | 2.623 | 2.584 | 2.616 | 2.567 | 2.640 | 2.631 | 2.546 | 2.589 | 2.646 | 2.649 |
| Liquidus, ° C | 1,114 | 1,200 | 1,139 | 1,058 | 1,138 | 1,099 | 1,124 | 1,270 | 1,126 | 1,156 | 1,099 | 1,225 |
| Viscosity at 1300° C., poises | 1,100 | 1,200 | 1,400 | 450 | 700 | 270 | 1,400 | 520 | 470 | 410 | 700 | 2,200 |
| Durability, wt. loss mg./cm.² (5% HCl-95 C.-24 hours) | 0.4 | 0.00 | 0.04 | 0.99 | | 5.3 | 0.04 | 0.06 | 1.2 | 0.9 | 0.02 | |

The core glasses may either be clear, opacified, or thermally crystallizable. We have found that our opal glasses can either spontaneously opacify during cooling or be opacified by a subsequent heat treatment. The heat treated opals can also, by a particular subsequent heat treatment, be converted to glass-ceramic materials.

We prefer to use clear core glasses of the alkali alumino-silicate type in the preferred embodiment of our invention. Generally speaking, the alumina ($Al_2O_3$) maintains a relatively high viscosity at the laminating temperatures while allowing the addition of alkali metal oxides to obtain a sufficiently high coefficient of thermal expansion. The $SiO_2$ should be present between about 50 and 75 percent by weight. Below 50 percent, the viscosity at the forming temperatures is too low and the liquidus too high. Above 75 percent, the expansion is too low and melting and forming becomes difficult. The $Al_2O_3$ should be present in the range of about 10 to 30 percent by weight. Below 10 percent, the viscosity is too low for forming and the expansion may also be too low. Above 30 percent, the liquidus is too high. The total alkali metal oxide should be A preferred clear core glass which falls within the above composition range is, in weight percent on the oxide basis as calculated from the batch, 56.8% $SiO_2$, 19.8% $Al_2O_3$, 12.8% $Na_2O$, 4.3% $K_2O$, 2.1% MgO, 3.2% CaO, and 1.0% $As_2O_3$. This core glass was made from a batch comprising the following batch ingredients:

| | |
|---|---|
| Keystone No. 1 Dry Sand | 62.4 grams |
| Nepheline Syenite | 880.0 grams |
| Soda Ash | 31.6 grams |
| Sodium Nitrate | 54.9 grams |
| Dolomite Limestone | 96.0 grams |
| Arsenic Trioxide | 10.0 grams |

The properties of this glass were as follows: softening point 863° C., annealing point 633° C., strain point 588° C., liquidus temperature of 1,114° C., the coefficient of thermal expansion between 0°–300° C. was $92.1 \times 10^{-7}/°$ C., density 2.484 g/cc, and the viscosity at 1,300° C. was 4500 poises.

Other clear alkali aluminosilicate core glasses which have properties within the desired ranges are disclosed in Table II.

TABLE II.—CLEAR ALKALI ALUMINOSILICATE CORE GLASSES

| | 1 | 2 | 3 | 4 | 5 | 6 | 7 | 8 | 9 |
|---|---|---|---|---|---|---|---|---|---|
| Weight percent oxides: | | | | | | | | | |
| $SiO_2$ | 58.5 | 62.5 | 75.0 | 54.5 | 58.5 | 58.5 | 58.5 | 65 | 58.4 |
| $Al_2O_3$ | 19.5 | 15.5 | 12.5 | 23.5 | 19.5 | 17.5 | 15.5 | 15 | 19.5 |
| $Na_2O$ | 16.5 | 12.5 | 12.5 | 12.5 | 6.5 | 12.5 | 8.5 | 20 | 12.5 |
| $K_2O$ | | 4.0 | | 4.0 | 4.0 | 4.0 | 4.0 | | 4.1 |
| CaO | 3.0 | 3.0 | | 3.0 | 9.0 | 3.0 | 7.0 | | 0.4 |
| MgO | 2.5 | 2.5 | | 2.5 | 2.5 | 2.5 | 6.5 | | 2.6 |
| $B_2O_3$ | | | | | | | 2.0 | | |
| $TiO_2$ | | | | | | | | | 2.0 |
| $Sb_2O_3$ | | | | | | | | | 0.5 |
| Properties: | | | | | | | | | |
| Expansion (0°–300° C.), $\times 10^{-7}/°$ C | 89.5 | 90.8 | 66.3 | 90.4 | 73.4 | 90.3 | 82.3 | 95.2 | 91.4 |
| Softening point, ° C | 826 | 877 | 825 | 819 | 890 | 797 | 833 | 740 | 890 |
| Annealing point, ° C | 611 | 657 | 564 | 590 | 681 | 590 | 638 | 525 | 643 |
| Strain point, ° C | 569 | 610 | 525 | 539 | 633 | 543 | 597 | 496 | 593 |
| Density, g./cc | 2.462 | 2.487 | | 2.453 | 2.520 | 2.478 | 2.550 | | 2.462 |
| Liquidus, ° C | 1,128 | 1,058 | | 1,078 | 1,164 | 1,034 | 1,189 | | 1,068 |
| Viscosity at 1300° C., poises | 2,450 | 3,600 | | 3,600 | 3,200 | 1,800 | 700 | | 7,000 |

Although we prefer to use clear core glasses of the alkali aluminosilicate type, clear core glasses of the alkaline earth metal aluminosilicate type may be substituted as a functional equivalent. Thus, the alkaline earth metal aluminosilicate glasses may be melted, shaped, formed, and laminated with the same facility as the alkali aluminosilicate glasses. However, for manufacturing reasons we prefer to use the alkali aluminosilicate glasses. Normally, the alkaline earth metal aluminosilicate glasses contain little, if any, of the alkali metal oxides. The $SiO_2$ should be between 40 and 60 percent by weight. Below 40 percent, the glass is too fluid. Above 60 percent, the expansion is too low. The $Al_2O_3$ should be present in the range of about 5 to 15 percent by weight. Below 5 percent, it is difficult to adjust the expansion, viscosity, and liquidus viscosity of the glass. Above 15 percent, the liquidus is too high. BaO should be present between 20 and 50 percent by weight. Below 20 percent, the expansion is too low and above 50 percent, the glass is too fluid. The SrO may be present up to 25 percent since above 25 percent, it is difficult to adjust the expansion and viscosity. Up to a total of 10 percent of the following oxides may be incorporated to obtain specific properties: $La_2O_3$, $B_2O_3$, CaO, MgO, $TiO_2$, $ZrO_2$, PbO, ZnO, CdO, and $P_2O_5$.

A preferred clear alkaline earth metal aluminosilicate core glass which falls within the above composition range is, in weight percent on the oxide basis as calculated from the batch 45.9% $SiO_2$, 9.1% $Al_2O_3$, 38.5% BaO, and 6.5% SrO. This core glass was made from a batch comprising the following batch ingredients:

| | |
|---|---|
| Morgan 200 Mesh Sand | 691.7 grams |
| A-1 Alumina | 136.2 grams |
| Barium Carbonate | 751.2 grams |
| Strontium Carbonate | 138.9 grams |

The properties of this glass were as follows: expansion $70.7 \times 10^{-7}/AL$ C., softening point 903° C., annealing point 719° C., strain point 676° C., density 3.372 g/cc, liquidus 1142, and viscosity at 1300° C. was 1,400 poises.

Other clear alkaline earth metal aluminosilicate core glasses which meet the aforementioned properties are disclosed in Table III.

TABLE III.—CLEAR ALKALINE EARTH METAL ALUMINO-SILICATE CORE GLASSES

| | 1 | 2 | 3 | 4 | 5 |
|---|---|---|---|---|---|
| Weight percent oxides | | | | | |
| $SiO_2$ | 48.1 | 45.8 | 45.0 | 42.8 | 46.1 |
| $Al_2O_3$ | 6.3 | 10.6 | 10.4 | 10.0 | 8.1 |
| $B_2O_3$ | | 0.5 | 0.4 | | |
| BaO | 41.6 | 33.7 | 29.2 | 45.7 | 45.8 |
| SrO | 3.8 | 9.4 | 6.6 | | |
| $La_2O_3$ | | | 8.3 | | |
| CaO | | | | 1.4 | |
| Properties: | | | | | |
| Expansion (0°–300° C.), $\times 10^{-7}/°$ C. | 73.3 | 66.3 | 63.6 | 71.5 | 71.4 |
| Softening point, ° C. | 887 | 910 | 931 | 905 | 898 |
| Annealing point, ° C. | 706 | 724 | 744 | 722 | 718 |
| Strain point, ° C. | 664 | 685 | 697 | 673 | 676 |
| Density, g./cc. | 3.346 | 3.286 | 3.327 | 3.416 | 3.391 |
| Liquidus, ° C. | 1,188 | 1,200 | 1,234 | 1,162 | 1,135 |
| Viscosity at 1,300° C., poises | 1,300 | 1,800 | 2,200 | 1,400 | 1,400 |

It is desirable to produce opaque, or opal, bodies and there are several glass systems which will yield opal glasses; however, we prefer to use the fluoride opal system for core glasses of our invention. This preference is based upon the ease of manufacturing the laminate.

We have been able to produce such an opal by slightly modifying the clear alkali aluminosilicate core glass compositions and making additions of from 3–8 percent fluoride. The modifications consist of: lowering the $Al_2O_3$ range to 3–20 from 10–30 percent, lowering the total alkali metal oxide range to 3–20 from 5–25 percent, lowering the minimum amount of $Na_2O$ to one-third of the total alkali from one-half of the total alkali, and raising the maximum $K_2O$ to 8 from 6 percent. The effect of any constituent being outside the range for the opal glass is the same as for that constituent being outside the range in the clear alkali aluminosilicate core glass. If the fluoride is below 3 percent, the opal will not be sufficiently dense and above 8 percent the viscosity of the glass is too low. An important property of these opals is that they opalize spontaneously during cooling and hence do not require a subsequent heat treatment for opalization. This opalization is due to the separation of calcium fluoride crystals in the glass. The fluoride can be introduced into the batch in compounds such as $CaF_2$, $Na_2SiF_6$, $AlF_3$, or $Na_3AlF_6$.

A dense white spontaneous opal which falls within the above composition range is, in weight percent as calculated from the batch, 65.1% $SiO_2$, 6.1% $Al_2O_3$, 5.0% $Na_2O$, 1.9% $K_2O$, 15.8% CaO, and 6.1% F. Such a glass was made from a batch comprising the following ingredients:

| | |
|---|---|
| Keystone No. 1 Dry Sand | 6532.0 grams |
| Soda Ash | 662.0 grams |
| Sodium Nitrate | 300.0 grams |
| Calcined Alumina | 619.0 grams |
| Calcium Carbonate | 1192.0 grams |
| Fluorspar | 1271.0 grams |
| Potassium Carbonate | 279.0 grams |

The properties of the glass prepared from the above batch were as follows: softening point greater than 970° C., annealing point 655° C., strain point 612° C., liquidus temperature of 1,194° C., coefficient of thermal expansion $79.1 \times 10^{-7}/°$ C., density 2.471 g/cc, and the viscosity at 1300° C. was 600 poises.

A dense gray spontaneous opal which falls within the above composition range is, in weight percent as calculated from the batch, 62.8% $SiO_2$, 11.8% $Al_2O_3$, 4.03% $Na_2O$, 3.38% $K_2O$, 0.35% MgO, 12.7% CaO, 0.54% $Fe_2O_3$, and 4.4% F. This glass was made from a batch comprising the following ingredients:

| | |
|---|---|
| Keystone No. 1 Dry Sand | 103.3 grams |
| St. Lawrence Fluorspar Tailings | 371.1 grams |
| C-20 Feldspar | 558.8 grams |

A typical analysis, by weight, of the St. Lawrence Fluorspar Tailings is as follows: 41.8% $SiO_2$, 11.4% F, 10% $Na_2O$, 31.0% CaO, 0.4% $MnO_2$, 1.3% $Fe_2O_3$, 3.4% $Al_2O_3$, 0.1% MgO, 1.2% $K_2O$, and 8.0% $CO_2$. The properties of the glass prepared from the above batch were as follows: annealing point 721° C., strain point 671° C., liquidus temperature of 1,170° C., coefficient of thermal expansion $79.5 \times 10^{-7}/°$C., density 2.484 g/cc, and the viscosity at 1,300° C. was 1,000 poises.

Other spontaneous opals which have properties within the desired ranges are disclosed in Table IV.

TABLE IV.—SPONTANEOUS OPAL CORE GLASSES

| | 1 | 2 | 3 | 4 | 5 | 6 | 7 | 8 | 9 | 10 |
|---|---|---|---|---|---|---|---|---|---|---|
| Weight percent oxides: | | | | | | | | | | |
| $SiO_2$ | 67.3 | 65.2 | 68.4 | 65.5 | 68.1 | 65.2 | 68.9 | 66.3 | 57.9 | 55.1 |
| $Al_2O_3$ | 8.1 | 7.9 | 4.1 | 7.9 | 8.3 | 6.1 | 8.3 | 8.0 | 13.3 | 14.8 |
| $Na_2O$ | 5.0 | 4.8 | 5.0 | | 5.0 | 4.9 | 5.1 | 4.9 | 5.3 | 6.5 |
| $K_2O$ | | | | 7.3 | | 1.9 | | | 4.3 | 7.5 |
| CaO | 13.5 | 6.5 | 13.6 | 13.4 | 9.1 | 15.8 | 13.8 | 13.3 | 11.3 | 7.1 |
| MgO | | | | | 3.3 | | | | 0.8 | 0.7 |
| $B_2O_3$ | | | | 2.8 | | | | | 0.7 | 0.6 |
| ZnO | | 9.4 | | | | | | | | 2.1 |
| F | 6.1 | 5.9 | 6.1 | 5.9 | 6.2 | 6.1 | 3.9 | 7.5 | 5.3 | 4.7 |
| $As_2O_3$ | | | | | | | | | 0.9 | 0.9 |
| Properties: | | | | | | | | | | |
| Expansion (0°–300° C.), $\times 10^{-7}/°$ C. | 69.8 | 59.1 | 71.5 | 73.8 | 68.3 | 79.1 | 67.6 | 72.5 | 84.2 | 93.7 |
| Softening point, ° C. | >970 | >901 | >970 | | | >970 | | >970 | | ~843 |
| Annealing point, ° C. | 737 | 654 | 634 | | | 655 | 734 | 780 | 679 | 622 |
| Strain point, ° C. | 694 | 600 | 590 | | | 612 | 696 | 717 | 629 | 569 |
| Density, g./cc. | 2.443 | 2.523 | 2.439 | 2.353 | 2.415 | 2.471 | 2.454 | 2.436 | 2.483 | 2.511 |

Another type of opal which can be used as a core glass is known as a heat-treatable opal. A heat-treatable opal is one in which opalization is developed by a subsequent nucleation and growth heat treatment and one which does not opalize during cooling from the liquidus temperature. One such opal major crystalline phase is zinc orthosilicate. The total crystalline content of the resultant opal glass is less than 10 percent by volume of the glass.

Other heat-treatable opals which have properties within the desired ranges are disclosed in Table V.

TABLE V.—FLUORIDE-NUCLEATED ZINC ORTHOSILICATE-TYPE OPAL GLASSES

| | 1 | 2 | 3 | 4 | 5 | 6 | 7 | 8 | 9 |
|---|---|---|---|---|---|---|---|---|---|
| Weight percent oxides: | | | | | | | | | |
| $SiO_2$ | 50.4 | 61.5 | 59.3 | 50.0 | 59.6 | 56.7 | 57.3 | 51.7 | 51.0 |
| $Al_2O_3$ | 21.2 | 16.6 | 15.9 | 21.2 | 18.3 | 17.5 | 18.2 | 20.4 | 20.0 |
| $Na_2O$ | 13.2 | 10.7 | 10.5 | 13.6 | 10.1 | 10.4 | 11.0 | 12.7 | 12.7 |
| ZnO | 8.6 | 7.8 | 8.2 | 8.7 | 8.2 | 7.5 | 9.0 | 8.6 | 8.4 |
| F | 4.7 | 3.6 | 5.7 | 4.7 | 5.0 | 4.7 | 5.0 | 3.2 | 5.5 |
| CaO | 2.0 | 1.1 | 5.7 | 2.0 | 0.9 | 0.6 | 0.4 | 2.0 | 0.8 |
| MgO | | | | | 0.4 | 0.4 | 0.2 | | 0.6 |
| $B_2O_3$ | | | | | | 0.4 | 0.2 | | 0.3 |
| PbO | | | | | | 1.8 | | | |
| BaO | | | | | | | | | 0.5 |
| Properties: | | | | | | | | | |
| Expansion (0°–300° C.), $\times 10^{-7}/°$ C | 82.3 | 69.1 | 79.8 | 84.2 | 64.8 | 67.2 | 70.1 | 82.1 | 85.1 |
| Softening point, ° C | | 791 | 879 | 751 | | 778 | 766 | | 706 |
| Annealing point, ° C | 551 | 528 | 632 | 545 | 537 | 537 | 532 | 522 | 520 |
| Strain point, ° C | 515 | 496 | 585 | 513 | 499 | 506 | 498 | 477 | 486 |
| Density, g./cc | 2.578 | 2.502 | 2.475 | 2.569 | 2.515 | 2.535 | 2.527 | 2.607 | 2.579 |
| Liquidus, ° C | 1,183 | 1,115 | 1,026 | 1,035 | 1,120 | 1,203 | 1,130 | 1,071 | 953 | has as its major crystalline phase zinc orthosilicate crystals which have grown on fluoride nucleation sites. However, the opal is still known as a fluoride opal. The composition range for a heat-treatable opal core glass of this type is set forth hereinafter in weight percent as calculated from the batch. The $SiO_2$ should be between about 50 and 70 percent. Below 50 percent, the viscosity is too low. If the $SiO_2$ is above 70 percent, the viscosity is too high. $Al_2O_3$ should be between about 15 and 25 percent. Above 25 percent, the viscosity is too high and the glass tends to have a low opacity when heat treated at low temperatures. Below 15 percent, the viscosity is too low and again the glass may have a low opacity. $Na_2O$ should be between about 7 and 14 percent. Below 7 percent, the coefficient of thermal expansion is too low and above 14 percent, the viscosity is too low. The ZnO should be between about 5 and 12 percent. If it is below 5 percent, the glass will have a low opacity and if it is above 12 percent, the viscosity will be too low. Fluorine should be between about 2.5 and 7 percent. Below 2.5 percent, the opacity is too low and above 7 percent, the viscosity is too low. The total amount of impurities should not exceed about 3 percent since the opacity may be low and problems relating to the glass's past thermal treatment may exist. These impurities include $As_2O_3$, CaO, MgO, $B_2O_3$, $Li_2O$, and BaO. Minor additions of $MnO_2$, $Fe_2O_3$, and other known colorants may be used to color the core compositions. The range of heat treatment schedules for these opals comprise: nucleation between about 500° C. to 650° C. for at least 10 minutes and growth above about 650° C. for at least 10 minutes.

A preferred heat-treatable opal core glass composition which is within the previously discussed ranges is as follows: 58.3% $SiO_2$, 18.4% $Al_2O_3$, 10.2% $Na_2O$, 8.3% ZnO, 3.9% F, 0.5% CaO, 0.2% MgO, and 0.15% $B_2O_3$. This glass was made from a batch comprising the following:

| | |
|---|---|
| Berkeley fine dry special sand | 562.0 grams |
| A–1 Calcined Alumina | 186.0 grams |
| $Na_2CO_3$ | 110.0 grams |
| $NaNO_3$ | 27.0 grams |
| $Na_2SiF_6$ | 83.0 grams |
| 100 Granule ZnO | 83.0 grams |
| $CaCO_3$ | 9.0 grams |
| Calcined Magnesite | 2.0 grams |
| Anhydrous $B_2O_3$ | 1.5 grams |

The preferred glass, as formed, is clear and has the following properties: liquidus temperature of 1,213, annealing point 540° C., strain point 494° C., the coefficient of thermal expansion between 0°–300° C. is 65.1 × $10^{-7}/°$ C., the density is 2.500 g/cc, and the viscosity at 1300° C. is 2400 poises. This glass was nucleated at between 540°–640° C. for ½ hour. Opalization took place upon further heating at 720° C. for ½ hour. This treatment results in a dense, white opal where the Slight modifications of the heat treatable opal glass composition ranges will yield thermally-crystallizable glasses. These glasses can be converted to glass-ceramics by first opalizing the glass and then subjecting the opalized glass to a further heat treatment. The major glass-ceramic phase, nepheline, probably nucleates upon the previously formed zinc orthosilicate crystals. Thus, this glass-ceramic may be characterized as a zinc-orthosilicate-nucleated nepheline-type glass-ceramic. In order to form the glass-ceramic, the opal must be heat treated at temperatures above those at which the opal was formed. These glass-ceramics have approximately the following composition in weight percent on the oxide basis as calculated from the batch: $SiO_2$ from about 44 to 61%, $Al_2O_3$ from about 19 to 23%, $Na_2O$ from about 10 to 14%, ZnO from about 7 to 10%, and F from about 3 to 6%. If the composition is outside the aforementioned ranges, a glass-ceramic cannot be formed. However, if the composition is still within the previously mentioned heat-treatable opal range an opal may be formed. On the other hand, if the composition is also outside the heat-treatable opal range, the associated effect is that which has been previously described. The impurity level is about the same as required for the heat-treatable opal. The heat treatment to form the glass-ceramic comprises opalizing the glass and then heating the opalized glass to a temperature between 750° C. and 850° C. for a sufficient length of time to form the glass-ceramic. A preferred glass-ceramic which falls into the above composition range is as follows: 54.0% $SiO_2$, 21.2% $Al_2O_3$, 13.1% $Na_2O$, 8.0% ZnO, 3.1% F, and 0.6% CaO. This glass-ceramic was made from the following batch ingredients:

| | |
|---|---|
| Berkeley fine dry special sand | 518.9 grams |
| A–1 Calcined Alumina | 214.3 grams |
| Soda Ash | 171.3 grams |
| Sodium Nitrate | 26.8 grams |
| Zinc Oxide | 89.3 grams |
| Sodium Silicofluoride | 64.9 grams |
| Calcium Carbonate | 10.8 grams |

The glass, as formed, was clear and had the following properties: coefficient of thermal expansion 78.2 × $10^{-7}/°$ C., softening point 775° C., annealing point 550° C., strain point 505° C., density 2.565 g/cc, liquidus temperature 1257° C., and the viscosity at 1300° C. was 2,800 poises. The glass was heat treated at 750° C. so as to convert it to a glass-ceramic. The resultant glass-ceramic was a highly crystalline, white, fine-grained material having a coefficient of thermal expansion of 100 × $10^{-7}/°$ C. and containing nepheline as the principal crystal phase.

Other glass-ceramics formed from the heat-treatable opals which meet the aforementioned properties are disclosed below in Table VI.

TABLE VI

Zinc-Orthosilicate-Nucleated Nepheline-Type Glass-Ceramics

|  | 1 | 2 | 3 | 4 |
|---|---|---|---|---|
| $SiO_2$ | 55.1 | 52.9 | 52.9 | 50.9 |
| $Al_2O_3$ | 21.7 | 20.8 | 20.8 | 19.9 |
| $Na_2O$ | 10.6 | 13.1 | 13.1 | 12.6 |
| ZnO | 9.1 | 8.7 | 8.8 | 8.4 |
| F | 3.0 | 3.8 | 3.8 | 5.5 |
| CaO | — | .5 | — | 1.03 |
| MgO | — | — | — | .75 |
| $B_2O_3$ | — | — | — | .75 |
| $As_2O_3$ | 0.5 | — | .5 | — |
| Expansion Glass (0°–300°C.), ×10⁻⁷/°C. | 78.9 | 80 | 77.4 | 75.4 |
| Softening Point, °C. | — | 776 | — | 750 |
| Annealing Point, °C. | 556 | 548 | 570 | 540 |
| Strain Point, °C. | 510 | 508 | 524 | 502 |
| Density, g/cc | 2.557 | 2.552 | 2.562 | 2.565 |
| Liquidus, °C. | 1105 | 1197 | 1245 | 1171 |
| Viscosity at 1300°C., Poises | 1900 | 1200 | 1000 | 750 |
| Expansion Glass-Ceramic (0°–300°C.), ×10⁻⁷/°C. | 100 | 101 | 102 | 102 |

In addition to using a zinc-orthosilicate-nucleated nepheline type glass-ceramic as the core material, it is possible to use titania-nucleated nepheline-type glass-ceramics. The thermally crystallizable glass having the appropriate composition must be within the viscosity and temperature limitations for forming the laminated sheet. Furthermore, it must have an appropriate coefficient of thermal expansion; the glass must also be capable of being heat treated at temperatures where the shaped body will not distort nor the adhered plies deform. The composition range of a glass-ceramic which will fulfill the afore-mentioned requirements is hereinafter described. The $SiO_2$ should be between about 50 and 65 percent by weight. Above 65 percent, the glass cannot be converted to a glass-ceramic below 850° C. Below 50 percent, the glass is too fluid at high temperatures. $Al_2O_3$ should be between about 20 and 30 percent by weight. Above 30 percent, the liquidus temperature is too high and no crystallization will occur below 850° C. Below 20 percent $Al_2O_3$, crystallization will not occur. The total of $Na_2O$ and CaO must be between about 15 and 20 percent. Above 20 percent, less desirable coarse grained crystallization will occur below 850° C. Below 15 percent, no fine grain crystallization will occur below 850° C. Individually, the $Na_2O$ should be between about 9 and 20 percent and the CaO between about 0 and 9 percent with the total being between 15 and 20 percent. If the $Na_2O$ were above 20 percent, then coarse-grained crystallization would occur. Below 9% $Na_2O$, fine-grained crystallization will not occur below 850° C. If the CaO exceeds 9 percent, no crystallization will occur below 850° C. MgO should be between about 0.25 and 3 percent. Below 0.25 percent, nucleation cannot take place and above 3 percent, the viscosity of the glass is too low. $TiO_2$ is used as the nucleating agent and is present in the range of about 3.0 to 6.0 percent. In addition to the above constituents, up to a total of about 5 percent of impurities such as CdO, ZnO, $As_2O_3$, $K_2O$, and $B_2O_3$ may be present in the glass. The range of heat treatments, or ceramming schedules, to form the above-ceramic comprises heating the thermally crystallizable glass at temperatures between 700° C. and 750° C. for at least 10 minutes so as to nucleate the crystal phase and then heating the nucleated glass at temperatures between 750° C. and 850° C. for at least 10 minutes so as to cause the nucleated crystals to grow. A preferred glass-ceramic which is within the above composition range is as follows: 52.15% $SiO_2$, 26.15% $Al_2O_3$, 10.30% $Na_2O$, 6.60% CaO, 0.95% MgO, 3.00% $TiO_2$, 0.35% $As_2O_3$, and 0.50% $Li_2O$. This glass-ceramic was made from the following batch ingredients:

| Berkeley fine dry special sand | 431.4 grams |
|---|---|
| A–1 Calcined Alumina | 244.6 grams |
| Soda Ash | 156.3 grams |
| Sodium Nitrate | 27.5 grams |
| Lime Hydrate | 90.1 grams |
| Magnesium Oxide | 9.1 grams |
| Titania | 30.2 grams |
| Arsenic Trioxide | 5.0 grams |
| Petalite | 113.6 grams |

The glass as formed was clear but was converted to a glass-ceramic material when heat treated according to the following schedule: heat to 700° C. at a rate of 300° C./hour, then heat to 825° C. at a rate of 30° C./hour, next hold at 825° C. for 1 hour, and then cool to room temperature. The resultant glass-ceramic was gray-white material having a coefficient of thermal expansion of $97 \times 10^{-7}$/° C.

Other titania-nucleated nepheline-type glass-ceramics which meet the aforementioned properties are disclosed in Table VII.

TABLE VII.—TITANIA-NUCLEATED NEPHELINE-TYPE GLASS-CERAMICS

|  | 1 | 2 | 3 | 4 | 5 | 6 | 7 |
|---|---|---|---|---|---|---|---|
| Weight percent oxides: | | | | | | | |
| $SiO_2$ | 60.0 | 51.4 | 52.6 | 56.1 | 53.6 | 56.2 | 56.1 |
| $Al_2O_3$ | 20.3 | 25.5 | 29.1 | 27.2 | 28.1 | 27.2 | 27.2 |
| $Na_2O$ | 12.6 | 10.4 | 18.3 | 10.0 | 18.3 | 13.7 | 11.7 |
| MgO | .9 | .9 | 2.0 | 1.0 | 2.5 | 1.0 | 1.0 |
| $TiO_2$ | 3.7 | 2.8 | 5.0 | 4.0 | 6.0 | 4.0 | 4.0 |
| $As_2O_3$ | .5 | .6 | 0.5 | 0.5 | 1.0 | 0.5 | 0.5 |
| $B_2O_3$ |  |  |  | 0.4 |  | 2.0 |  |
| CaO | 1.9 | 6.7 | 0.9 | 8.0 |  | 5.0 | 7.0 |
| BaO |  |  |  | 0.6 |  |  |  |
| PbO |  |  |  |  |  |  |  |
| $Li_2O$ |  |  | 1.5 |  |  |  |  |
| Properties: | | | | | | | |
| Expansion glass (0°–300° C.), ×10⁻⁷/° C |  |  |  | 69.6 |  | 78.1 | 72.7 |
| Softening point, ° C | 909 | 884 |  | 903 |  | 894 | 905 |
| Annealing point, ° C | 681 | 677 | 661 | 703 | 627 | 690 | 703 |
| Strain point, ° C | 640 | 634 | 622 | 659 | 593 | 652 | 663 |
| Density, g./cc | 2.459 | 2.533 | 2.517 | 2.540 | 2.5 | 2.52 | 2.527 |
| Liquidus, ° C | 1,073 | 1,233 | 1,192 | 1,245 | 1,090 | 1,143 | 1,243 |
| Expansion glass-ceramic (0°–300° C.), ×10⁻⁷/° C | 77.3 | 72.6 | 90.8 | 94.8 | 90 | 105.1 | 99.3 |

A final consideration in selecting the compositions is that the forming process produces substantial amounts of waste, or cullet, which should be recycled into the core glass batch since the cullet is primarily a core glass. However, adjustments must be made in the core glass compositions so that the constituents which are present in the adhered plies and not in the core glass will not deleteriously affect the properties of the core glass. These constituents will be relatively minor since the amount of glass from the adhered plies being recycled into the core glass batch is relatively small.

The following examples will be better illustrate the laminates of our invention:

EXAMPLE I

Two separate sheets of glass for the adhered plies of the following composition were formed: 57.77% $SiO_2$, 14.94% $Al_2O_3$, 9.96% CaO, 6.87 MgO, 3.98% $B_2O_3$, 5.98% BaO, and 0.50%

As$_2$O$_3$. A single sheet of clear alkali aluminosilicate core glass of the following composition was also formed: 56.84% SiO$_2$, 19.80% Al$_2$O$_3$, 12.80% Na$_2$O, 3.18% CaO, 4.30% K$_2$O, 2.11% MgO, and 0.99% As$_2$O$_3$. These sheets were fused together, at about 1,300° C., so as to form a three-ply laminated sheet wherein the core glass was the center ply. At 1,300° C., the viscosity of the core glass was about 4,000 poises while that of the adhered plies was about 1000 poises. Thus, the viscosity ratio, at the laminating temperature, was 4:1. The liquidus temperature of the core and adhered plies were 1047° C. and 1,144° C., respectively. The hot laminated sheet was next sagged into a custard cup shaped mold, trimmed, removed from the mold, and allowed to cool. The resultant custard cut had a rim diameter of 4 ½ inches, a bottom diameter of 3 inches, and was 1 ⅝ inches high. The core glass ply was 0.080 inch thick and the total thickness of the adhered plies was 0.004 inch, resulting in a thickness ratio of about 20:1. At the laminating temperature, the coefficient of thermal expansion of the core glass was 94 × 10$^{-7}$/° C. while that of the adhered plies was 46 × 10$^{-7}$/° C. This combination of thickness ratios and expansion mismatch resulted in a body exhibiting a MOR of about 48,000 psi. The custard cup was found to withstand impacts of up to 0.41 foot pounds. To determine violence of breakage, a center punch test was used. This test comprises placing a center punch in the center of the cup and striking the punch with increasing force until the cup breaks. Upon testing several cups, it was found that they break into 5 to 10 pieces with little, if any, explosive violence.

EXAMPLE II

Glass for the adhered plies of the following composition was melted: 56.70% SiO$_2$, 14.85% Al$_2$O$_3$, 11.92% CaO, 8.57% MgO, and 7.90% B$_2$O$_3$. A spontaneous opal glass of the following composition was also melted: 58.57% SiO$_2$, 13.46% Al$_2$O$_3$, 5.35% Na$_2$O, 4.30% K$_2$O, 11.39% CaO, .82% MgO, 0.71% B$_2$O$_3$, and 5.40% F. These glasses were then formed into a three ply laminate, as in Example I, wherein the opal glass was the center ply. These glasses were laminated at 1,285° C. where the viscosity of the core glass was about 500 poises and the viscosity of the adhered plies was about 470 poises. Thus, the viscosity ratio was about 1:1. This laminate was then formed into a custard cup as in Example I. In this cup the thickness of the core was 0.080 inch while the total thickness of the skin glass was 0.004 inch. These thicknesses resulted in a thickness ratio of about 20:1. The coefficient of thermal expansion at the laminating temperature of the core glass was 89 × 10$^{-7}$/° C. while that of the skin glass as 47 × 10$^{-7}$/° C. This combination of thickness ratios and expansion mismatches resulted in a body exhibiting a MOR of about 47,000 psi. The cup was then impact tested and found to withstand impacts of up to 0.04 foot-pounds. When tested for violence of breakage the cups were found to break into about 11 pieces with little, if any, explosive violence.

EXAMPLE III

A heat-treatable opal core glass of the following composition was melted: 59.80% SiO$_2$, 18.35% Al$_2$O$_3$, 10.80% Na$_2$O, 1.05% CaO, 0.40% MgO, 7.40% Zno, 3.80% F, and 0.35% B$_2$O$_3$. This glass was laminated as in Example I with two sheets of glass for the adhered plies as in Example II. The laminating temperature was 1,280° C. whereat the viscosity of the core glass was about 2,200 poises and that of the adhered plies was about 470 poises. Thus, the viscosity ratio was about 5:1. The liquidus of the adhered plies was about 1,126° C. while that of the core glass was 1,166° C. A custard cup was then formed as in Example I wherein the core thickness was 0.090 inch and the total thickness of the adhered plies was 0.006 inch. After forming, the cup was opalized by a heat-treatment according to the following schedule: heat to 630° C. and hold thereat for ½ hour, next heat from 630° C. to 710° C. and hold thereat for ½ hour, and then cool to ambient temperature. The particular thicknesses resulted in a ratio of about 15:1. The coefficient of expansion at the laminating temperature of the core glass was 70 × 10$^{-7}$/° C. This combination of thickness ratio and expansion mismatch resulted in a body exhibiting a MOR of about 33,000 psi. The impact strength of the body was about 0.5 foot-pounds. The violence of breakage was quite low in that the bodies tested broke into from 3 to 5 pieces.

EXAMPLE IV

A thermally crystallizable core glass of the following composition was melted: 54.60% SiO$_2$, 21.20% Al$_2$O$_3$, 13.10% Na$_2$O, 0.60% CaO, 8.60% ZnO, and 3.10% F. This glass was laminated, as in Example I, with two sheets of glass for the adhered plies as in Example II. The laminating temperature was 1,300° C. and at that temperature the viscosity of the core glass was about 1,000 poises and that of the adhered plies was about 470 poises. Thus, the viscosity ratio was about 2:1. The liquidus of the adhered plies was at about 1,126° C. while that of the core glass was about 1,197° C. A custard cup was then formed as in Example I wherein the core thickness was 0.090 inch and the total thickness of the adhered plies was 0.006 inch. the cup was clear and the core glass had an expansion of 80 × 10$^{-7}$/° C. After forming, the cup was cerammed by a heat treatment according to the following schedule: heat to 630° C. and hold thereat for ½ hour, heat to 750° C. and hold thereat for 1 hour, and then cool to ambient temperature. This treatment converted the glass core to a zinc orthosilicate-nucleated nepheline-type glass-ceramic. The expansion of the glass-ceramic was now 100 × 10$^{-7}$/° C. The particular thicknesses resulted in a ratio of about 15:1. This combination of thickness ratio and expansion mismatch resulted in a body exhibiting a MOR of about 50,000 psi. The impact strength of these custard cups was about 0.5 foot-pounds. When the custard cups were subjected to the center punch test, they broke into from 10 to 50 pieces.

EXAMPLE V

A thermally crystallizable core glass of the following composition was melted: 52.15% SiO$_2$, 26.15% Al$_2$O$_3$, 10.30% Na$_2$O, 6.60% CaO, 3.00% TiO$_2$, 0.95% MgO, 0.35% As$_2$O$_3$, and 0.50% Li$_2$O. A glass for the adhered plies of the following composition was also melted: 62.2% SiO$_2$, 14.8% Al$_2$O$_3$, and 23.0% CaO. These glasses were laminated as in Example I, at about 1,300° C. At that temperature, the viscosity of the core glass was about 2,800 poises and that of the adhered plies was about 1400. Thus, the viscosity ratio was about 2:1. The liquidus of the adhered plies was about 1,139° C. while that of the core glass was about 1,224° C. A custard cup was then formed, as in Example I wherein the core thickness was 0.100 inch and the total skin thickness was 0.005 inch. The cup was clear and the clear uncerammed core had an expansion of 70 × 10$^{-7}$/° C. After forming, the cup was cerammed by a heat treatment according to the following schedule: heat to 700° C. and hold thereat for ½ hour, next heat at the rate of 100° C./hour to 810° C. and hold thereat for at least ½ hour, and then cool to ambient temperature. This treatment converted the glass core to a titania-nucleated nepheline-type glass-ceramic core. The expansion of the glass-ceramic core was now 97 × 10$^{-7}$/° C. while that of the adhered plies was 54 × 10$^{-7}$/AL C. The particular thicknesses were in the ratio of about 20:1. This combination of thicknesses and expansion mismatch resulted in a body exhibiting a MOR of about 40,000 psi. The impact strength of these custard cups was about 0.35 foot-pounds. When the custard cups were subjected to the center punch test, they broke into two pieces.

Although the above examples are set forth only for five specific combinations of glasses, many other combinations may be used. For example, various combinations of glasses, from Table I, and glasses, from Tables II, III, IV, V, VI, and VII can be laminated so as to form a strengthened article, provided that the forming and physical parameters are maintained within the aforementioned limits. Furthermore, glasses other than those disclosed in Tables I, II, III, IV, V, VI, and VII may be selected provide they have properties within those limitations set forth for the various glasses. Thus, although there are many examples of specific glasses and combinations thereof, many other glasses and combinations may be used provided their compositions and properties are within the applicable limitations.

The above discussion and descriptions have related to all glass and mixed glass and glass-ceramic laminates. We have also discovered that all-glass-ceramic laminates can be prepared. These laminates are prepared by laminating sheets of thermally crystallizable glasses and then heat treating the laminate so as to convert the glass to a glass-ceramic. The forming parameters such as viscosity ratios, liquidus temperature, etc. are the same for the thermally crystallizable glasses as they are for the other systems described. The heat treating parameters are also similar in that there should be a reversal of the viscosity relationship. However, the maximum heat treating temperatures are greater than 850° C. Furthermore, the thicknesses and ratios for the glass containing laminates also apply to the all-glass-ceramic laminates. As in the all-glass and mixed-glass and glass-ceramic laminate, the strength is related to the strain which could be approximated by the expansion mismatch at the setting point of the softest glass in the laminate. However, in the case of an all-glass-ceramic laminate, the setting point of the softest glass-ceramic is several hundred degrees greater than that of a glass. Thus, the expansion mismatch at the setting temperature can be less even though the strain is the same, since the setting point to use temperature differential is greater for an all-glass-ceramic laminate than for a laminate having glass therein. Normally, in the all-glass-ceramic laminate, the expansion mismatch will be at least $15 \times 10^{-7}/°$ C. which is the same as that for a laminate having glass therein. However, in some cases the expansion mismatch may be as low as $5 \times 10^{-7}/°$ C. Furthermore, useful glass-glass-ceramic laminates can be prepared which have very high or very low coefficients of thermal expansions. Thus, the glass-ceramic laminates may fall outside those expansion ranges which we have discovered for glass containing laminated systems.

EXAMPLE VI

A laminate was prepared wherein the core ply had the following composition, in weight percent on the oxide basis: 64.8% $SiO_2$, 20.0% $Al_2O_3$, 2.0% $B_2O_3$, 0.5% $Na_2O$, 0.2% $K_2O$, 3.5% $Li_2O$, 1.8% $MgO$, 2.2% $ZnO$, 4.25% $TiO_2$, and 0.75% $As_2O_3$. The adhered plies had the following composition, as calculated from the batch, in weight percent on the oxide basis: 64.5% $SiO_2$, 22.9% $Al_2O_3$, 0.3% $Na_2O$, 0.2% $K_2O$, 1.8% $MgO$, 1.5% $ZnO$, 3.8% $Li_2O$, 1.0% $As_2O_3$, 2.0% $TiO_2$, and 2.0% $ZrO_2$. After lamination and heat treatment, the core ply had as its principal crystal phases beta-spodumene solid solution and rutile. The adhered plies had as their principal crystal phase beta-quartz solid solution. The coefficient of expansion of the glass-ceramic core ply was $10 \times 10^{-7}/°C$. while that of the adhered plies was $-5 \times 10^{-7}/°$ C. These expansions resulted in a mismatch of $15 \times 10^{-7}/°$ C.

EXAMPLE VII

A laminate can be prepared where both the core ply and the adhered plies are nepheline-type glass-ceramics. A thermally crystallizable glass sheet of the following composition, in weight percent on the oxide basis, was prepared for the core ply: 40.5% $SiO_2$, 31.2% $Al_2O_3$, 10.4% $Na_2O$, 9.5% $K_2O$, 0.2% $CaO$, 0.1% $MgO$, 7.4% $TiO_2$, and 0.7% $As_2O_3$. Two sheets of the following thermally crystallizable glass composition, in weight percent on the oxide basis, were prepared for the adhered plies: 43.5% $SiO_2$, 31.5% $Al_2O_3$, 12.5% $BaO$, 12.5% $Na_2O$, and 6.0% $TiO_2$. These sheets can be laminated and then heat treated to form the glass-ceramic laminate. After heat treatment, the core ply would have as its principal crystal phases anatase and nepheline solid solution with a corresponding coefficient of thermal expansion of $130 \times 10^{-7}/°$ C. The adhered plies have as their principal crystal phases beta-spodumene solid solution and rutile with a corresponding coefficient of thermal expansion of $85 \times 10^{-7}/°$ C. This would result in an expansion mismatch of about $45 \times 10^{-7}/°$ C.

EXAMPLE VIII

Another laminate can be prepared wherein the core ply is of the same composition as the adhered plies described in din Example VII and wherein the present adhered plies have the following composition, in weight percent on the oxide basis, 56.2% $SiO_2$, 19.8% $Al_2O_3$, 14.5% $MgO$, 9.1% $TiO_2$, and 0.4% $As_2O_3$. After lamination and heat treatment, the adhered plies had as their principal crystal phase cordierite. The expansion of the adhered plies was $54 \times 10^{-7}/°$ C. while that of the core was $85 \times 10^{-7}/°$ C. This resulted in a mismatch of $31 \times 10^{-7}/°$ C.

EXAMPLE IX

A laminate can also be prepared wherein the core ply has the same composition as in Example VII and the adhered plies have the same composition as the core ply of Example VI. After lamination and heat treatment, the adhered plies had as their principal crystal phases beta-spodumene solid solution and rutile. The expansion of the core was then $130 \times 10^{-7}/°$ C. while that of the adhered plies was $11 \times 10^{-7}/°$ C.

EXAMPLE X

A laminate can be prepared wherein the core ply is of the same composition as the adhered plies in Example IX. The adhered plies for this laminate have the following composition, in weight percent on the oxide basis, 50.1% $SiO_2$, 35.8% $Al_2O_3$, 8.4% $Li_2O$, 4.7% $TiO_2$, 0.1% $Na_2O$, 0.2% $K_2O$, 0.5% $Fe_2O_3$ and total $CaO$ and $MgO$ is 0.2%. After lamination and heat treatment, the adhered plies had as their principal crystal phase beta-eucryptite solid solution with an expansion of $2 \times 10^{-7}/AL$ C. This resulted in a mismatch of $9 \times 10^{-7}/°$ C.

Thus, our invention also includes the discovery of all-glass-ceramic laminates and the method of manufacturing said laminates.

We claim:

1. A high strength glass or glass and glass-ceramic laminate comprising a tensilely-stressed core portion and a compressively stressed surface layer fused to and substantially enveloping said core portion such that the fused glass surface between said core portion and said surface layer is essentially defect-free wherein:
   a. the ratio of the thickness of said core portion to the total thickness of said surface layer is at least about 10:1;
   b. the thickness of said surface layer is at least about 0.002 inch; and
   c. the coefficient of thermal expansion of said surface layer at the setting point is at least about $15 \times 10^{-7}/°$ C. less than the coefficient of thermal expansion of said core portion.

2. A high strength laminate according to claim 1 wherein
   a. the coefficient of thermal expansion of the compressively stressed adhered layer is between $30-80 \times 10^{-7}/°$ C.; and
   b. the coefficient of thermal expansion of the tensilely stressed core portion is between $60-110 \times 10^{-7}/°$ C.

3. A high strength laminate according to claim 1 consisting of a three-ply sheet having a core ply and two adhered plies.

4. A high strength laminate according to claim 3 wherein the ratio of the thickness of the tensilely-stressed ply to the total thickness of the compressively-stressed plies adjacent thereto is less than 30:1.

5. A high strength laminate according to claim 3 wherein the adhered plies are glass and consist essentially of, in weight percent on the oxide basis as calculated from the batch:
   a. from 50 to 65% $SiO_2$;
   b. from 10 to 20% $Al_2O_3$;
   c. from 5 to 25% $CaO$;
   d. from 0 to 12% $MgO$;
   e. from 0 to 10% $B_2O_3$;
   f. from 0 to 12% total of at least one compound selected from the group consisting of $BaO$, $SrO$, $ZnO$, and $La_2O_3$; and
   (g) from 0 to 5 percent total of at least one compound selected from the group consisting of $Li_2O$, $Na_2O$, $K_2O$, $TiO_2$, and $ZrO_2$.

6. A high strength laminate according to claim 3 wherein the core ply is a clear alkaline earth metal aluminosilicate glass, consisting essentially of, in weight percent on the oxide basis as calculated from the batch: a. from 40 to 60% $SiO_2$; b. from 5 to 15% $Al_2O_3$; c. from 20 to 50% BaO; d. from 0 to 25% SrO; and e. from 0 to 10% total, of at least one compound selected from the group consisting of $La_2O_3$, $B_2O_3$, CaO, MgO, $TiO_2$, $ZrO_2$, PbO, ZnO, CdO, and $P_2O_5$.

7. A high strength laminate according to claim 3 wherein the core ply is a clear alkali aluminosilicate glass consisting essentially of, in weight percent on the oxide basis as calculated from the batch:
 a from 50 to 75% $SiO_2$;
 b from 10 to 30% $Al_2O_3$;
 c from 5 to 25 percent total alkali oxide with $Na_2O$ comprising at least one-half of the total alkali metal oxide and with from 0 to 6% $K_2O$;
 d from 0 to 20 percent total alkaline earth metal oxide;
 e from 0 to 10 percent total of at least one compound selected from the group consisting of $La_2O_3$, $TiO_2$, $ZrO_2$, $Nb_2O_5$, ZnO, CdO, $GeO_2$, PbO, $Bi_2O_3$, $CeO_2$, and $B_2O_3$;
 f. from 0 to 2 percent of at least one compound selected from the group consisting of $As_2O_3$ and $Sb_2O_3$;
 g from 0 to 1.5 percent chloride; and
 h from 0 to 5 percent total of at least one coloring oxide selected from the group consisting of the oxides of Cr, Mn, Fe, Co, Cu, Nd, V, and Ni.

8. A high strength laminate according to claim 3 wherein the core ply is a spontaneous opal glass consisting essentially of, in weight percent on the oxide basis as calculated from the batch:
 a from 50 to 75% $SiO_2$;
 b from 3 to 20% $Al_2O_3$;
 c from 3 to 20% total alkali metal oxide with $Na_2O$ comprising from at least one-third of the total alkali metal oxide and with from 0 to 8% $K_2O$;
 d from 0 to 20 percent total alkaline earth metal oxide;
 e. from 0 to 10 percent total of at least one compound selected from the group consisting of $La_2O_3$, $TiO_2$, $ZrO_2$, $Nb_2O_5$, ZnO, CdO, $GeO_2$, PbO, $Bi_2O_3$, $CeO_2$, and $B_2O_3$;
 f. from 0 to 2 percent of at least one compound selected from the group consisting of $As_2O_3$ and $Sb_2O_3$;
 g. from 0 to 1.5 percent chloride;
 h. from 0 to 5 percent total of at least one compound selected from the group consisting of the oxides of Cr, Mn, Fe, Co, Cu, Nd, V, and Ni; and
 i. from 3 to 8 percent fluoride.

9. A high strength laminate according to claim 3 wherein the core ply is a heat-treatable opal glass consisting essentially of, in weight percent on the oxide basis as calculated from the batch:
 a. from 50 to 70% $SiO_2$;
 b. from 15 to 25% $Al_2O_3$;
 c. from 7 to 14% $Na_2O$;
 d. from 5 to 12% ZnO;
 e. from 2.5 to 7 percent fluoride; and
 f. from 0 to 3 percent total of at least one compound selected from the group consisting of $As_2O_3$, CaO, MgO, $B_2O_3$, $Li_2O$, and BaO.

10. A high strength laminate according to claim 3 wherein the core ply is a zinc orthosilicate-nucleated nepheline-type glass-ceramic consisting essentially of, in weight percent on the oxide basis as calculated from the batch:
 a. from 44 to 61% $SiO_2$;
 b. from 19 to 23% $Al_2O_3$;
 c. from 10 to 14% $Na_2O$;
 d. from 7 to 10% ZnO;
 e. from 3 to 6 percent fluoride; and
 f. from 0 to 3 percent total of at least one compound selected from the group consisting of $As_2O_3$, CaO, MgO, $B_2O_3$, $Li_2O$, and BaO.

11. A high strength laminate according to claim 3 wherein the core ply is a titania-nucleated, nepheline-type glass-ceramic consisting essentially of, in weight percent on the oxide basis as calculated from the batch:
 a. from 50 to 65% $SiO_2$;
 b. from 20 to 30% $Al_2O_3$;
 c. from 15 to 20 percent total $Na_2O$ and CaO with (1) from 9 to 20% $Na_2O$, and (2) from 0 to 9% CaO; d. from 0.25 to 3% MgO;
 e. from 3 percent to 6 percent $TiO_2$; and f. from 0 to 5 percent total of at least one compound selected from the group consisting of CdO, ZnO, $As_2O_3$, $K_2O$, and $B_2O_3$.

12. A high strength glass-ceramic laminate comprising a tensilely-stressed surface layer fused to and substantially enveloping said core portion such that the fused surface between said core portion and said surface layer is essentially defect-free wherein:
 a. the ratio of the thickness of said core portion to the total thickness of said surface layer is at least about 10:1;
 b. the thickness of said surface layer is at least about 0.002 inch; and
 c. the coefficient of thermal expansion of said surface layer is at least about $5 \times 10^{-7}/°C$. less than the coefficient of thermal expansion of said core portion.

13. A high strength laminate according to claim 12 consisting of a three-ply sheet having a core ply and two adhered plies.

14. A high strength laminate according to claim 13 wherein the ratio of the thickness of the tensilely stressed ply to the total thickness of the compressively stressed plies adjacent thereto is less than 30:1.

15. A high strength laminate according to claim 13 wherein:
 a. the tensilely-stressed core ply is a glass-ceramic selected from the group consisting of beta-spodumene solid solution and rutile, anatase and nepheline solid solution; and
 b. the compressively-stressed adhered plies are a glass-ceramic selected from the group consisting of beta-quartz solid solution, beta-spodumene solid solution, and rutile, cordierite and beta-eucryptite solid solution.

* * * * *